United States Patent [19]
Peterson et al.

[11] 3,762,700
[45] Oct. 2, 1973

[54] ALIGNING DEVICE
[75] Inventors: John Allan Peterson, New Brighton; Jerome L. Johnson, St. Paul, both of Minn.
[73] Assignee: Honeywell Information Systems Inc., Waltham, Mass.
[22] Filed: Dec. 20, 1971
[21] Appl. No.: 209,805

[52] U.S. Cl. .................................. 271/49, 271/59
[51] Int. Cl. ............................................. B65h 9/10
[58] Field of Search ................. 271/49, 59, 52, 48, 271/58

[56] References Cited
UNITED STATES PATENTS
| | | | |
|---|---|---|---|
| 2,937,020 | 5/1960 | Layden | 271/59 X |
| 1,763,598 | 6/1930 | Christophel | 271/48 X |
| 2,208,044 | 7/1940 | Ormond et al | 271/48 X |
| 1,074,067 | 9/1913 | Rea | 271/52 |
| 561,773 | 6/1896 | Dexter | 271/49 X |

FOREIGN PATENTS OR APPLICATIONS
| | | | |
|---|---|---|---|
| 488,782 | 5/1927 | Germany | 271/48 |

*Primary Examiner*—Evon C. Blunk
*Assistant Examiner*—Bruce H. Stoner, Jr.
*Attorney*—Aubrey C. Brine et al.

[57] ABSTRACT

A combination feed and alignment arrangement is provided for use in a document transfer device wherein the document feed means and a document aligning means which is continuously in operation are combined such that a document is transferred from the influence of one means to the other by a pivotable control means.

10 Claims, 3 Drawing Figures

PATENTED OCT 2 1973 3,762,700

ALIGNING DEVICE

BACKGROUND OF THE INVENTION

The present invention relates to document feeding and aligning devices, and more particularly to a device for providing operation of one activity only, either feeding or aligning, by imparting the influence of either the feeding or aligning device to the document.

In the field of electronic computer devices, there are a great many applications which require the relatively high-speed feeding of documents to a work station where a reading, punching, printing etc. operation is performed on the document. Generally, there is a requirement that the document be aligned in at least one direction on entering the work station such that the reader, punch etc. might perform its function at the proper location on the document. Additionally, in the case where feeders and alignment devices are employed in conjunction with document readers there is also the problem of handling the documents such that inked characters printed thereupon are not smudged or erased by mechanical devices in frictional contact with the document surface.

While the problem of document feeding and aligning is not a new one, those devices which have been devised in the prior art to accomplish this end, have proven to be complex in nature, which tends to decrease the reliability of the overall device. Additionally, those devices which perform both feeding and edge guidance on a particular carrier are prone to produce a skewing of the documents, and impart stresses to the document which tend to tear the document or in some instances smear the surface of the document.

The present invention therefore has as an object to overcome objectional features of prior art feeding and aligning devices by providing such a device which is simple in construction and operation, and therefore more reliable than those prior art devices.

A further object of the present invention is to provide a feeding and aligning device which does not impart undue stresses to the document being fed, and substantially prevents smearing of the document surface.

Yet another object of the invention is to which will a device for feeding and aligning documents wherein the feeding and aligning operations are separately performed, the document being positively removed from the influence of one while the other is in operation.

SUMMARY OF THE INVENTION

The above objects, as well as other objects will become apparent as the description proceeds, are achieved by providing a device for feeding and aligning documents which comprises feed means for imparting motion to a document in a first direction and aligning means for imparting motion to a document in a second direction towards an edge guide surface. The combination further includes means for imparting a normal force to the feed means to clamp a document therebetween and place the document under the influence of the feed means. To achieve the objectives of the invention means is further provided for simultaneously moving the normal force means and the feed means relative to one another and the aligning means and the document being fed relative to one another, to simultaneously transfer the document from the influence of one, either said feeding means or said aligning means, to the other.

BRIEF DESCRIPTION OF THE DRAWINGS

For a better understanding of the present invention reference should be had to the accompanying drawings, wherein.

DESCRIPTION OF THE PREFERRED EMBODIMENT

Figure 1:
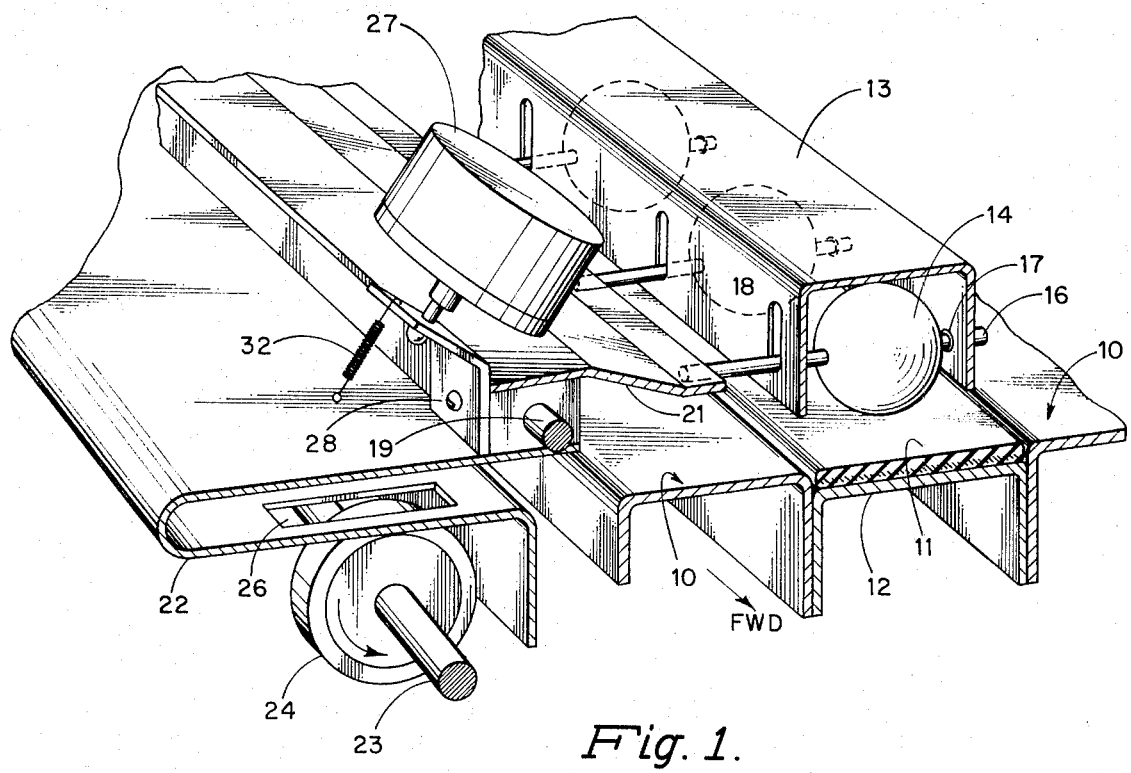
FIG. 1 is a fragmentary perspective view, partially in section, showing a portion of a document feeding and aligning device constructed in accordance with the teachings of the present invention.

Referring now to FIG. 1, there is shown a device for feeding and aligning documents wherein a platform 10 is provided for supporting documents to be transported in the forward direction as indicated by the arrow. The platform 10 is split and a feed belt 11, which travels over a channel member 12, is introduced in the opening provided in the platform. The feed belt 11 is supported by the channel 12 in a manner such that the belt's surface protrudes slightly above the platform 10, and may be driven by any pulley and motor means well known in the art, which for the purposes of this invention is not shown.

It should here be noted that the platform 10 as well as the belt 11 are shown only as a fragmentary portion of the respective structure and these elements may extend both in the forward direction and in the rearward direction over any feed length desired. It will be evident from the following description of the invention that the invention is not limited to any particular length of feed device, however, the fragmentary portion shown would be exemplary of any device operating in accordance with the present invention.

Referring still to FIG. 1, the structure further comprises a channel member 13 which is rigidly supported above the belt 11 over the length of the feed platform 10. The channel member 13 serves as a housing for a plurality of roller members in the form of spheres 14, each sphere being mounted for rotation on an axle 16.

To accommodate the spheres 14, one leg of the channel member 13 is provided with a plurality of circular openings 17 which receive the axle 16 in a substantially loose fitting engagement to allow for vertical movement of the sphere 14 without binding in the opening. The opposite leg of the channel member 13 is provided with a plurality of slotted openings 18 for receiving the opposite end of the axle 16, and permitting vertical movement of the axle, and hence the spheres 14.

To lower portion of the slotted openings 18 and the openings 17 are located relative to the belt 11 such that each of the spheres 14 is capable of being moved downwardly towards the belt to exert what is effectively a point load on a belt when the axle 16 has pressure supplied to it in the downward direction.

Adjacent the platform 10 and supported above it, there is provided a rocker bar 19 which also extends over the length of the platform. The rocker bar 19 is supported for a rotation on the rigid main frame of the assembly (not shown) and has attached to the upper surface thereof a flattened Z-shaped member 21. To the lower surface of the bar 19 there is attached a U- shaped member 22 having an inner surface which serves as a document edge guide means. Both the members 21 and 22 extend the length of the platform form 10 and are formed such that the outer flange of the member 21 extends over an end of each of the shafts 16, while the lower leg of the U-shaped member 22 is in juxtaposition with the platform 10 and serves as an extension of the platform.

Directly under the member 22 a shaft 23 is supported on the main frame of the structure for rotation, and extends for the length of the guide member 22. A plurality of rollers 24 having a substantially high friction surface are mounted on the shaft 23 and are spaced to provide the edge guide function as will be explained in greater detail in the following description. As will be evident to one skilled in the art, both the spacing of the rollers 24 and the spheres 14 will generally be determined by the type of document to be encountered in the document feed device, smaller documents obviously requiring closer spacing of the rollers and spheres.

At each roller position along the U-shaped guide member 22, a slotted opening 26 is formed in the lower leg of the member. The slotted openings 26 are each of a dimension to permit the roller 24 to enter the opening and extend above the surface of the guide member 22 without contacting the member.

At a location approximately midway between the extremities of the length dimension of the members 21 and 22 a solenoid 27 is attached to the rocker bar 19 by an angle member 28. The solenoid 27 is fixed to a portion of the frame (not shown) and has the movable plunger 31 attached to the angle member 28. A helical spring 32 is also attached to the angle member 28 and has the opposite end fixed to the frame structure for biasing the angle member away from the solenoid 27 when the solenoid is in the inactivated condition.

Figure 2:
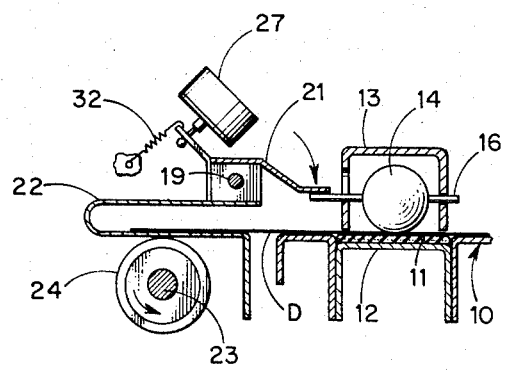
FIG. 2 is a sectional view of the device of FIG. 1 taken on a reduced scale and showing the device in the feed mode of operation.
Figure 3:
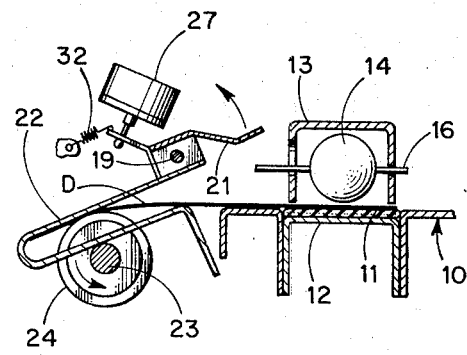
FIG. 3 is a sectional view similar to FIG. 2 showing the device of FIG. 1 in the aligning mode of operation.

For an understanding of the operation of the device, reference should now be had to FIG. 1 taken in conjunction with FIGS. 2 and 3. As depicted in FIG. 2, with a document D located on the platform 10 the belt 11 is being continuously driven in a direction to move the document forward as shown by the arrow of FIG. 1. The solenoid 27 is in the activated position, the spring 32 is under tension and the rocker bar 19 is rotated in the clockwise direction by the action of the solenoid. The Z-shaped member 21 serves as a lever arm and applies downward pressure to each of the axles 16 thereby forcing the spheres 14 downwardly onto the belt 11. The document D therefore, is subjected to controlled movement along the platform 10 by virtue of the contact between the belt 11 and the spheres 14 with the document located therebetween.

During this operation, the rollers 24 are continuously in motion however, the clockwise rotation of the rocker bar 19 maintains the U-shaped guide member above the rollers and out of contact therewith, as best shown in FIG. 2.

In the embodiments shown, the solenoid 27 is connected into the electrical line driving the motor which operates the belt 11. Thus, when the motive means for operating the belt 11 is deenergized, the solenoid 27 is also deenergized.

As shown in FIG. 3, with the solenoid 27 in the deenergized state, the spring 32 serves to rotate the rocker bar 19 counterclockwise thereby removing the pressure exerted by the member 21 on the axles 16. The document D is now free of the pinch exerted between the spheres 14 and the belt 11 which was necessary to provide controlled movement of the document along the platform 10. Counterclockwise motion of the rocker bar 19 simultaneously moves the edge guide member 22 downwardly to introduce the rotating rollers 24 into the opening 26 to a position above the surface of the edge guide member. The document D now is influenced by the relatively high-friction surface of the rollers 24 which apply a normal force to the upper leg of the U-shaped member 22 with the document therebetween and is moved outwardly from the platform 10 and into an aligned position dictated by the inner surface of the radius of the edge guide member 22.

Thus, let us assume that in the arrangement shown, documents are being fed to a document reader or other operating device. While the documents being fed along the feeding device, as each document is located in the operating device, the belt 11 is stopped for a short period of time during the reading operation. During this time period, the preceding documents will be aligned by virtue of inactivating the drive means for the belt 11 which in turn deenergizes the solenoid 27 of the present invention.

It should therefore be evident that the various objects of the present invention are achieved by the foregoing described invention which is simple in operation and construction. Additionally, it should be evident to the reader that should the document be provided with printed matter on its surface, there is little chance of smudging, erasure, or inadvertent destruction of the document by virtue of the document being removed from the control of one, either the feeding or aligning means, when the other is operating on the document.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. In a document handling arrangement, a device for feeding and aligning documents comprising:
   feed means for imparting motion to a document in a first direction,
   means for applying a normal force to said feed means to clamp a document therebetween and place said document under the influence of said feed means,
   an edge guide surface in spaced relation with said feed means, aligning means for imparting to a document located between said feed means and said force applying means a force in a direction toward said edge guide surface, when said aligning means is in contact with the document, and
   a member pivotable about an axis parallel to said first direction and having a first portion extending outwardly therefrom for contacting said normal force applying means and imparting a force thereto which is translated into a normal force on said documents by said force applying means, said pivotable member further having a second portion extending outwardly therefrom in the opposite direction and having a portion for supporting a document located between said feed means and said normal force applying means, said second portion being disposed adjacent said aligning means and spaced therefrom to effect contact of a document supported thereon with said aligning means when said pivotable member is in one position and to support said document out of contact with said aligning means when said member is pivoted to another position, whereby said pivotable member is effective in causing relative movement between said force applying means and said feed means and simultaneously causing relative movement between said aligning means and a document being fed to simultaneously transfer said document from the influence of either one, said feed means or said aligning means, to the other.

2. A document handling device as set forth in claim 1 wherein said feed means comprises a drive belt having a surface for contacting documents to be fed by said device.

3. A document handling device as set forth in claim 2, wherein said aligning means comprises a plurality of aligning rollers having their axes of rotation parallel with said feed means motion.

4. A document handling device as set forth in claim 2 wherein said means for applying a normal force to said feed means comprises a plurality of feed roller members.

5. A document handling device as set forth in claim 4 wherein each of said roller members is a sphere supported for rotational movement and movement normal to said feed means.

6. A document handling device as set forth in claim 1 wherein said aligning means comprises a plurality of aligning rollers having their axes of rotation parallel with said feed means motion.

7. In a document handling arrangement, a device for feeding and aligning documents comprising:

feed means comprising a drive belt having a surface for contacting documents to be fed by the device, a plurality of spheres supported for rotational movement and movement normal to said drive belt for applying a normal force to said drive belt to clamp a document therebetween and place said document under the influence of said belt, an edge guide surface in spaced relation with said drive belt, and a plurality of aligning rollers having their axes of rotation parallel with said drive belt for imparting to a document located between said drive belt and said spheres a force in a direction toward said edge guide surface when said aligning rollers are in contact with the document, and a member pivotable about an axis parallel to document movement in the direction of said drive belt, said pivotable member having a first portion extending outwardly therefrom for imparting a force to said spheres which is translated into a normal force on said document, said pivotable member having a second portion extending outwardly therefrom in the opposite direction and having a surface for supporting a document located between said drive belt and said spheres, said second portion further having a plurality of openings formed in said surface, each in alignment with one of said plurality of aligning rollers, whereby pivoting of said pivotable member in one direction is effective to cause said first portion to apply force to said spheres and maintain said second portion surface above said aligning rollers and pivoting of said pivotable member in the opposite direction is effective to remove the force applied by said first portion and move said second portion surface toward said aligning rollers to a position wherein said rollers extend through said openings, and in contact with a document located on said surface.

8. A document handling device as set forth in claim 7 which further includes a solenoid connected to said pivotable member for causing pivoting about said member axis.

9. In a document handling arrangement, a device for feeding and aligning documents comprising:

feed means for imparting motion to a document in a first direction, means for applying a normal force to said feed means to clamp a document therebetween and place said document under the influence of said feed means, an edge guide surface in spaced relation with said feed means, a plurality of aligning rollers having their axes of rotation parallel with said feed means for imparting to a document located between said feed means and said force applying means a force in a direction toward said edge guide surface, when said aligning rollers are in contact with the document, and a member pivotable about an axis parallel to document movement in said first direction, said pivotable member having a first portion extending outwardly therefrom for contacting said normal force applying means and imparting a force thereto which is translated into a normal force on said document by said force applying means;

said pivotable member further having a second portion extending outwardly therefrom in the opposite direction and having a surface for supporting a document located between said feed means and said normal force applying means, said second portion further having a plurality of openings formed in said surface each in alignment with one of said plurality of aligning rollers, whereby pivoting of said pivotable member in one direction is effective to cause said first portion to apply force to said normal force applying means and maintain said second portion surface above said aligning rollers and pivoting of the pivotable member in the opposite direction is effective to remove the force applied by said first portion and move said second portion surface toward aligning rollers to a position wherein said rollers extend through said openings and in contact with a document located on said surface.

10. A document handling device as set forth in claim 9 which further includes a solenoid connected to said pivotable member for causing pivoting about said member axis.

* * * * *